US009071892B2

(12) United States Patent
Gratke et al.

(10) Patent No.: US 9,071,892 B2
(45) Date of Patent: Jun. 30, 2015

(54) SWITCHING BETWEEN ACOUSTIC PARAMETERS IN A CONVERTIBLE VEHICLE

(75) Inventors: Jesse T. Gratke, Royal Oak, MI (US); Craig A. Lambert, Macomb, MI (US); Kurt J. Reichert, Macomb, MI (US)

(73) Assignee: General Motors LLC, Detroit, MI (US)

( * ) Notice: Subject to any disclaimer, the term of this patent is extended or adjusted under 35 U.S.C. 154(b) by 521 days.

(21) Appl. No.: 13/471,051

(22) Filed: May 14, 2012

(65) Prior Publication Data

US 2013/0304475 A1 Nov. 14, 2013

(51) Int. Cl.

| | |
|---|---|
| ***G10L 21/00*** | (2013.01) |
| ***G10L 15/00*** | (2013.01) |
| ***G10L 25/00*** | (2013.01) |
| ***H04R 3/00*** | (2006.01) |

(52) U.S. Cl.

CPC .................. *H04R 3/00* (2013.01); *H04R 3/005* (2013.01); *H04R 2410/01* (2013.01); *H04R 2499/13* (2013.01)

(58) Field of Classification Search

USPC ......... 704/225, 226, 233, 235, 246, 270, 271, 704/272, 274

See application file for complete search history.

(56) References Cited

U.S. PATENT DOCUMENTS

| | | | | |
|---|---|---|---|---|
| 5,680,468 | A * | 10/1997 | Van Hout et al. | 381/86 |
| 5,850,458 | A * | 12/1998 | Tomisawa et al. | 381/71.4 |
| 6,324,451 | B1 * | 11/2001 | Regan | 701/36 |
| 6,674,865 | B1 * | 1/2004 | Venkatesh et al. | 381/107 |
| 7,583,806 | B2 * | 9/2009 | Holmi et al. | 381/86 |
| 7,957,540 | B2 * | 6/2011 | Ludwig et al. | 381/86 |
| 2002/0097884 | A1 * | 7/2002 | Cairns | 381/71.4 |
| 2004/0142672 | A1 * | 7/2004 | Stankewitz | 455/296 |
| 2004/0247141 | A1 * | 12/2004 | Holmi et al. | 381/86 |
| 2005/0100174 | A1 * | 5/2005 | Howard et al. | 381/86 |
| 2005/0187763 | A1 * | 8/2005 | Arun | 704/226 |
| 2005/0221852 | A1 * | 10/2005 | D'Avello et al. | 455/518 |
| 2005/0221877 | A1 * | 10/2005 | Davis et al. | 455/575.9 |
| 2005/0226442 | A1 * | 10/2005 | Landon et al. | 381/104 |
| 2006/0013416 | A1 * | 1/2006 | Truong et al. | 381/119 |
| 2008/0043996 | A1 * | 2/2008 | Dolph et al. | 379/388.07 |

* cited by examiner

*Primary Examiner* — Edgar Guerra-Erazo
(74) *Attorney, Agent, or Firm* — Anthony Luke Simon; Reising Ethington P.C.

(57) ABSTRACT

A method of configuring an acoustics system of a convertible vehicle to receive speech from an occupant of the vehicle who is using hand-free technology. The position of the top of the convertible is first determined and based upon whether the top is up or down, an audio reception configuration is selected. The audio reception configuration includes a set of tuning parameters and a microphone arrangement. The acoustics system is then configured based upon the determination of whether the top is up or down.

16 Claims, 3 Drawing Sheets

SWITCHING BETWEEN ACOUSTIC PARAMETERS IN A CONVERTIBLE VEHICLE

TECHNICAL FIELD

The present invention relates generally to acoustic systems in a vehicle, and more specifically to the use of hands-free technology within the vehicle.

BACKGROUND OF THE INVENTION

Many modern vehicles permit the user to wirelessly communicate with others while driving without holding a cellular telephone. In some instances, the user may simply need to depress a button to initiate the call. Such vehicles may have speech recognition capability and thereby recognize the user's speech as a command through a vehicle microphone. Thus, while the user is operating the vehicle, the vehicle may place the call in the user's behalf and connect him or her to the third party. The third party may then be heard by the user via the vehicle speakers.

The transmission of such calls may be executed while the user operates the vehicle in a closed vehicle cabin environment, free of excessive wind and background noise. However, when the vehicle being operated is a convertible and the top is down, the user's speech to initiate the call or the speech interaction between the two parties during the call may be distorted to the point that it is unintelligible.

SUMMARY OF THE INVENTION

According to an aspect of the invention, there is provided a method of configuring an acoustics system of a convertible vehicle to receive speech from an occupant of the vehicle, comprising the steps of: (a) determining a position of a top of a convertible vehicle, wherein the positions include top-up and top-down, wherein the acoustics system has at least two audio reception configurations for receiving speech from an occupant of the vehicle; and then (b) configuring the acoustics system to use one of the configurations based on the determination.

According to another aspect of the invention, there is provided an acoustic system for a convertible vehicle having a top, comprising: (a) a vehicle user interface in the vehicle, wherein the vehicle user interface comprises a memory device and a processor, wherein the memory stores at least two audio reception configurations; (b) at least one position sensor in the vehicle having a sensor input and a sensor output, wherein the sensor input detects a position of the top of the vehicle, and the sensor output is coupled to the vehicle user interface; (c) a microphone system in the vehicle, wherein the microphone system comprises at least one microphone; wherein the processor selects one of the audio reception configurations based on the sensor output.

According to yet another aspect of the invention, there is provided a method of configuring an acoustics system of a convertible vehicle to receive speech from an occupant of the vehicle, comprising the steps of: (a) determining a position of a top of a convertible vehicle, wherein the positions include top-up and top-down, wherein the acoustics system has a first and a second audio reception configuration for receiving speech from an occupant of the vehicle, wherein the first audio reception configuration includes a first set of tuning parameters and a microphone system having at least a uni-directional microphone, wherein the second audio reception configuration includes a second set of tuning parameters and a microphone system having at least an omni-directional microphone; and then (b) configuring the acoustics system to use the first audio reception configuration when it is determined that the top of the vehicle is up, and to use the second audio reception configuration when it is determined that the top of the vehicle is down.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to a dynamic acoustics system in vehicles having vehicle electronics that support hands-free communication. In such vehicles, two-way communication may occur where an occupant's speech is picked up by one or more microphones in the vehicle's passenger cabin and where the other party's speech may be heard through the vehicle speakers. Each vehicle has a set of acoustic parameters based upon the design of: the vehicle, its components, and the microphone(s) itself. In addition, for each vehicle a set of tuning parameters exist. These tuning parameters reduce echo and noise, and amplify the speech portion of the received sound. Thus, a set of properly tuned parameters may enhance transmission quality during hands-free calling or during occupant-vehicle interactions, such as by requesting turn-by-turn instructions. However, convertible vehicles present special acoustic challenges, because the acoustic parameters may be different when the top is up versus down; thus the tuning parameters may not work efficiently, because the background noise may be greater, and because the microphones may be saturated by air turbulence. These obstacles may be overcome, as will be described below, through the use of multiple microphones of varying type as well as by use of a second set of tuning parameters. Furthermore, the microphones, sets of tuning parameters, or both, may be selected based upon a determination of whether the top of the convertible vehicle is up or down. The description that follows first describes the operating environment and then describes the system and methods which may be employed.

Communications System—

Figure 1:
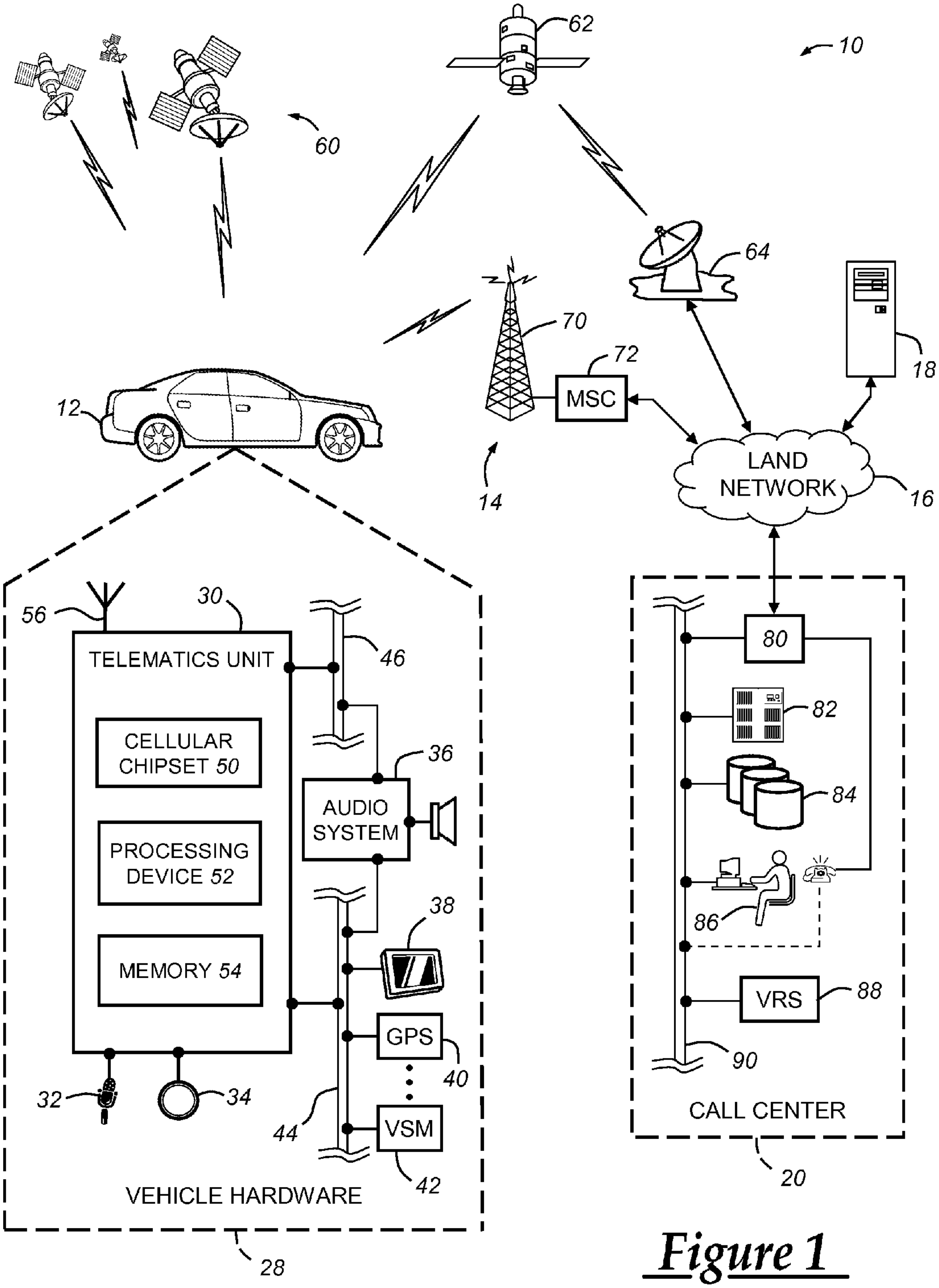
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle may be a convertible-style. A convertible vehicle may be any vehicle having a top that may be lowered or removed. The top may comprise a fitted, integral, or attached part of the external upper covering of the vehicle's passenger area; it may further comprise the frame for supporting the upper covering. The material of the top may vary; e.g., it may comprise vinyl, canvas, fiberglass, etc. The term convertible as used herein is intended to be generic; e.g., convertible vehicles may also be known as drop-head, drop-top, top-down, etc. vehicles. Examples of convertibles include vehicles with manual or electro-mechanical removal, lowering, or stowage functionalities. For example, the tops of some convertibles may contract or expand while the vehicle is in motion or while the driver is operating the vehicle. Convertible tops include both hard and soft designs which may be secured in the top-up or top-down position by a variety of fasteners or mechanisms. Some convertible tops may be completely detached from the vehicle and stowed apart from the vehicle. In some vehicles, positioning the top-up or top-down may be actuated by a switch or similar vehicle user control. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42.

Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver.

Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

One VSM may detect whether the convertible position is completely top-up or completely top-down, or in transition (i.e., somewhere in between). The VSM may use one or more sensors to detect the position of the top. For example, the sensor may be a proximity sensor to determine whether the top is fully up or down. In some instances, proximity sensors may use electrostatic and/or electromagnetic fields, electromagnetic radiation, photo-electric effect, etc. (examples include relays and Hall effect sensors). An analog or digital signal may be used to indicate that the top is up, down, or in transition; such signal may be communicated discretely or via the communications bus 44 to the telematics unit 30 or other vehicle user interface. Other embodiments may include a sensor detecting a more precise position of the top (e.g., up, down, or incrementally somewhere therebetween). To detect increments, a variety of sensors may be used; e.g., angular displacement sensors, angle sensors, resolvers, encoders, or even a plurality of proximity sensors located at incremental angles. Angular position may be determined by a variety of different technologies including rotary variable differential transducer (RVDT), rotary inductance, synchro-machine, magnetoresistive effect, capacitive, Hall effect, optical, and/or potentiometer. These incremental sensors may be near to, adjacent to, or coupled to gears, levers, etc. of a mechanism for raising or lowering the top. As before, all sensors may be analog or digital and be communicated to the telematics unit 30 via discrete signals or via a signal on the communications bus 44.

Vehicle electronics 28 also includes a number of vehicle user interfaces that provide vehicle occupants with a means of providing and/or receiving information, including a microphone system 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone system 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The microphone system 32 may comprise one or more microphones. The microphones may be uni-directional, bi-directional, cardioid, omni-directional, etc. In one embodiment, the microphone system 32 may comprise one uni-directional microphone and one omni-directional microphone. In another embodiment, the microphone system 32 may comprise a single microphone in which the directivity may be selected; e.g., an adjustable grill or an adjustable shroud near the microphone input may convert an otherwise omni-directional microphone into a uni-directional, bi-directional, etc. microphone.

The pushbutton(s) 34 allow manual user input into the telematics unit 30 to initiate wireless telephone calls and provide other data, response, or control input. The pushbutton(s) 34 may be located in a variety of locations on the vehicle; e.g., they may be located on the steering wheel, the rear-view mirror, or the vehicle's interior ceiling. The pushbutton(s) 34 may be hard or soft keys; hard keys are hard-coded performing a single functionality (such as a number key pad or an Send/End key) whereas soft keys are flexibly programmable to invoke any of a number of functions rather than being associated with a single fixed function or a fixed set of functions. In one embodiment, the pushbuttons may enable a vehicle user or occupant to answer/end a telephone call and control speaker volume (up/down). Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle user interface provided by the telematics unit 30 or otherwise may permit the occupant to conduct hands-free communication. Hands-free communication means that the occupant (e.g., the driver) may communicate with the vehicle or with another person via telecommunications either without the use of his/her hands or with only limited use of his/her hands. For example, the occupant may instruct or command the vehicle to provide turn-by-turn directions to a destination. The occupant's command may be received by the microphone system 32. The vehicle may be equipped with computerized speech recognition technology (including software, hardware, or a combination of both). The occupant's spoken command may activate or wake-up the speech recognition technology (e.g., to a READY state). Or the occupant may otherwise activate the technology (e.g., the occupant may depress a designated push button 34 in order for the vehicle to 'listen' to the command), and then the occupant may utter the command. Once received, the command may be deciphered and processed within the telematics unit 30. The vehicle may respond by determining the geographic location in relationship to its particular GPS location and by audibly conveying turn-by-turn instructions to the vehicle occupant using the vehicle's audio system 36 (e.g., via one or more vehicle speakers). In addition as mentioned above, hands-free communication may also include telecommunications with another person (e.g., a cellular telephone call). Conducting a hands-free telephone call may be implemented in various ways; however, common to all embodiments is that the occupant does not need to hold a handheld communications device (HCD) device. In one embodiment, the telematics unit 30 of the vehicle 12 is capable of placing or receiving a wireless telephone call. Similar to the procedure above, the occupant activates or wakes up the vehicle's speech recognition technology (e.g., by speaking a command or instruction or by depressing a pushbutton 34). After the occupant utters the command, the microphone system 32 receives the command and the telematics unit 30 processes the command (e.g. by dialing a phone number or by answering an incoming call). The vehicle 12 may acknowledge the command using the vehicle's audio system 36 (e.g., the vehicle may transmit via the speakers in the vehicle "Calling Robert."). Once the call is connected, the occupant's speech may continue to be received via the microphone system 32 and the other party's voice may be heard over the audio system 36 using the vehicle speakers. The call may be terminated by the occupant using a pushbutton 34. In another embodiment, the occupant may use a HCD to conduct the wireless telephone call by placing the HCD in a docking station or otherwise connecting it to a jack, wherein the station or jack is connected to the vehicle electronics 28. In this embodiment, the occupant may place or receive the call by voice actuation using the vehicle's speech recognition technology, by pushbutton 34, or by depressing a switch or button on the HCD itself. Similarly, the call may be terminated. However once connected to the other party, the call may otherwise function the same—i.e., the occupant may hear the other party via the speakers of the audio system 36 and the occupant's speech may be received using the vehicle's microphone system 32. In yet another embodiment where the occupant's HCD is used to conduct the call, Bluetooth® may be used to couple the HCD to the vehicle electronics 28 in lieu of a docking station or jack.

When the occupant uses hands-free technology, the quality of the reception of the occupant's speech or utterances by the microphone system 32 may be at least partially dependent upon the vehicle acoustic parameters. Acoustic parameters include, among other things, factors such as the cabin size or passenger area within the vehicle 12, the type of upholstery (e.g., whether cloth, leather, etc.), the microphone packaging, the heating/ventilation and air conditioning (HVAC) intensity, the audio system 36 speaker(s) location with respect to the location of the microphone(s), and the microphone characteristics. Microphone packaging includes the microphone(s) location (e.g., in the vehicle headliner, the overhead console, the A-pillar, etc.); the grill-size and thickness of the microphone(s), the acoustic port blockage of the microphone(s), the retention features of the microphone(s), and the orientation of the microphone with respect to the occupant. Microphone characteristics include frequency response, directivity, and sensitivity. Therefore, it will be appreciated by one skilled in the art that the acoustic parameters may vary according to the vehicle's make and model.

In order to improve the quality of the reception of an occupant's speech or utterance using the microphone system 32, such acoustic parameters may have been accounted for during acoustic design and manufacture of the vehicle 12; furthermore, a set of tuning parameters may have been adjusted to optimize or enhance the sound reception at the microphone(s) or the microphone system 32. In general, tuning parameters may be adjusted at both the sending end of the transmission and at the receiving end. At the sending end, the tuning parameters may include: acoustic echo cancellation (AEC), noise reduction (NR), parametric equalization (PEQ), automatic gain control (AGC), and a send limiter. At the receiving end, tuning parameters may include: PEQ, AGC, a receive limiter, and dynamic level control (DLC). AEC cancels the speaker signal picked up by the microphone during the occupant's utterance (e.g., some of the speaker's voice may intentionally be sent through the speaker while the occupant speaks to provide assurance to the occupant that the call is still connected; this feedback can cause undesirable acoustic echo). NR attempts to eliminate or minimize sound other than the occupant's voice without significantly affecting the quality of the occupant's utterance. These sounds may include background noise from the environment and/or the vehicle. For example, environmental noises may include wind, rain, sleet, hail, etc. Examples of vehicle noise may include engine, transmission, or other mechanical and electro-mechanical vehicle noises (such as the air conditioner, brake pump, serpentine belt, windshield wipers, window/sunroof electric motors, etc.). PEQ is a means of filtering the sound by increasing the magnitude of the occupant's voice while controlling the bandwidth (e.g., isolating the occupant's voice on its center frequency). The use of a limiter (send or receive) minimizes the distortion that occurs when the sound wave is clipped (e.g., truncated above or below a maximum or minimum magnitude) by smoothing out the sound wave where it was clipped. And DLC adjusts the volume level of the received signal depending upon noise within the vehicle 12 (e.g., it may increase the volume so that the occupant does not need to do so). Properly adjusted tuning parameters may aid in computerized speech recognition—as the received speech may have greater clarity (e.g., be more distinctive) and therefore capable of being more easily interpreted by the vehicle's speech recognition technology. In most circumstances, one set of tuning parameters may be tuned to accommodate a given make and model of a vehicle.

Now turning to the wireless carrier system 14. This carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

As previously discussed, the use of hands-free technology in a convertible vehicle with the top-down presents unique challenges, and the predetermined set of tuning parameters may work less than optimally or may not work at all when the top is down. This is due in part to the change in some of the acoustic parameters when the top is down. For example, one acoustic parameter is cabin size; when the convertible is top-down, the size of the cabin is expanded exponentially but the tuning parameters may have been adjusted to a finite cabin size. In addition, the tuning parameters may no longer be properly adjusted. For example, the noise reduction algorithm which functioned properly in an enclosed cabin may not function adequately when the convertible top is down; i.e., because in general, the noise magnitude may be substantially greater than in a top-up condition, and the magnitude of certain frequencies may also be greater than what would be dampened when the top was up. Another challenge to the use of hands-free technology with a convertible top-down includes microphone saturation. As will be appreciated by those skilled in the art, a uni-directional microphone (in microphone system 32) is commonly employed in a vehicle having hands-free capability. This may be desirable since the position of the occupant (often the driver) does not substantially deviate, and since uni-directional microphones are sensitive to sounds from only one direction. Therefore, selecting a uni-directional microphone may eliminate background noise. However, uni-directional microphones are more susceptible to saturation in a turbulent air environment, and once the microphone saturates, it no longer receives any sound (including the occupant's voice). Saturation may occur when the sound intensity (e.g., the pressure waves) is greater than the microphone's ability to absorb the sound(s). This is problematic since when the vehicle top is down and the vehicle is in motion (or when the environment is windy), the microphone may saturate. It should be appreciated that audible inputs other than wind also may saturate the microphone.

The acoustic challenges presented by the top-down convertible may be overcome by having multiple audio reception configurations. The audio reception configurations disclosed herein may be operated in accordance with the techniques disclosed in U.S. application Ser. No. 13/372,249, filed on Feb. 13, 2012, entitled "SPEECH PROCESSING RESPONSIVE TO ACTIVE NOISE CONTROL MICROPHONES" which is assigned to the assignee hereof and is incorporated herein by reference in its entirety. An audio reception configuration, as used herein, means a configuration comprising one or more microphones (which may have any type of directivity) and a set of tuning parameters. The microphone(s) may include uni-directional, bi-directional, cardioid, omni-directional, etc. The set of tuning parameters may be adapted to a convertible vehicle with the top-up (or to a non-convertible vehicle) or to a convertible with the top-down. In one embodiment, a convertible vehicle may have two audio reception configurations. For example, a first audio reception configuration may employ a uni-directional microphone and a first set of tuning parameters adjusted to the make and model of the vehicle in a top-up condition. A second audio reception configuration may include a omni-directional microphone and a second set of tuning parameters adjusted to the make and model of the vehicle in a top-down condition. When the top is up, hands-free communication may be conducted using the first audio reception configuration. When the top is down, hands-free communication may be conducted using the second audio reception configuration. By using two different audio reception configurations, the hands-free communication becomes possible whether the top is up or down. It should be appreciated that this embodiment is merely exemplary and that other embodiments may be implemented. For example, in the first audio reception configuration having the first set of tuning parameters different microphones may be used. This configuration may also use for example (a) only an omni-directional microphone; or (b) an omni-directional microphone and a uni-directional microphone; or (c) any combination of uni-directional and omni-directional microphones. Furthermore, the second audio reception configuration having a second set of tuning parameters may also use different microphones. This configuration may use for example (a) only an omni-directional microphone; or (b) at least one omni-directional microphone and any number of uni-directional microphones. The microphone used in either the first or second configurations may include a microphone in which the directivity may be selected (e.g., it may have an adjustable grill or an adjustable shroud near the microphone input which may be moved to alter the directivity of the microphone from omni-directional to uni-directional, and back again). The number of audio reception configurations is not limited to two; a vehicle may have three or more. For example, a third audio reception configuration may be implemented when the convertible top is neither up nor down, but somewhere in between. This third configuration may have a third set of tuning parameters and may use an arrangement of one or more microphones (and each microphone may be of the same or different directivity).

In addition to the convertible vehicle having multiple audio reception configurations, the vehicle may automatically switch between the configurations during or between hands-free wireless calls, or during or between occupant and vehicle interactions (such as issuing to the vehicle a command to call another person or to obtain destination directions via GPS). As previously described, the vehicle may comprise a VSM which detects the position of the convertible top (whether up, down, or somewhere in between). The VSM may communicate a signal to the telematics unit 30 indicating the position of the convertible top. The values of the tuning parameters may be stored in the memory 54 of the telematics unit 30. And further, the telematics unit 30 may be coupled to the microphone system 32. Therefore, as will be appreciated by one skilled in the art, a control system may be implemented wherein two or more different audio reception configurations may be utilized based upon the state of the top (i.e., whether the top is up, down, or somewhere in between).

In one embodiment, the switch between audio reception configurations (e.g., between a first and a second) may occur when the top is being raised or lowered and crosses a threshold value. This threshold value may be preset by the manufacturer and may be an angular value or a position-related value of the vehicle top as detected by vehicle sensors; e.g., the threshold value may be when the top is 30% down (whether being raised or lowered). In another approach, the threshold value may be microphone saturation; e.g., when the microphone reaches 90% saturation, a different audio reception configuration is selected.

It should be appreciated that the tuning parameter values may be implemented by hardware or software. While the values may be stored in software (e.g., in the memory 54), they may also be represented by an electronic circuit within the telematics unit 30. Where the values are stored in the software of the telematics unit 30, they may be altered or updated by newer software versions by the manufacturer.

Figure 2:
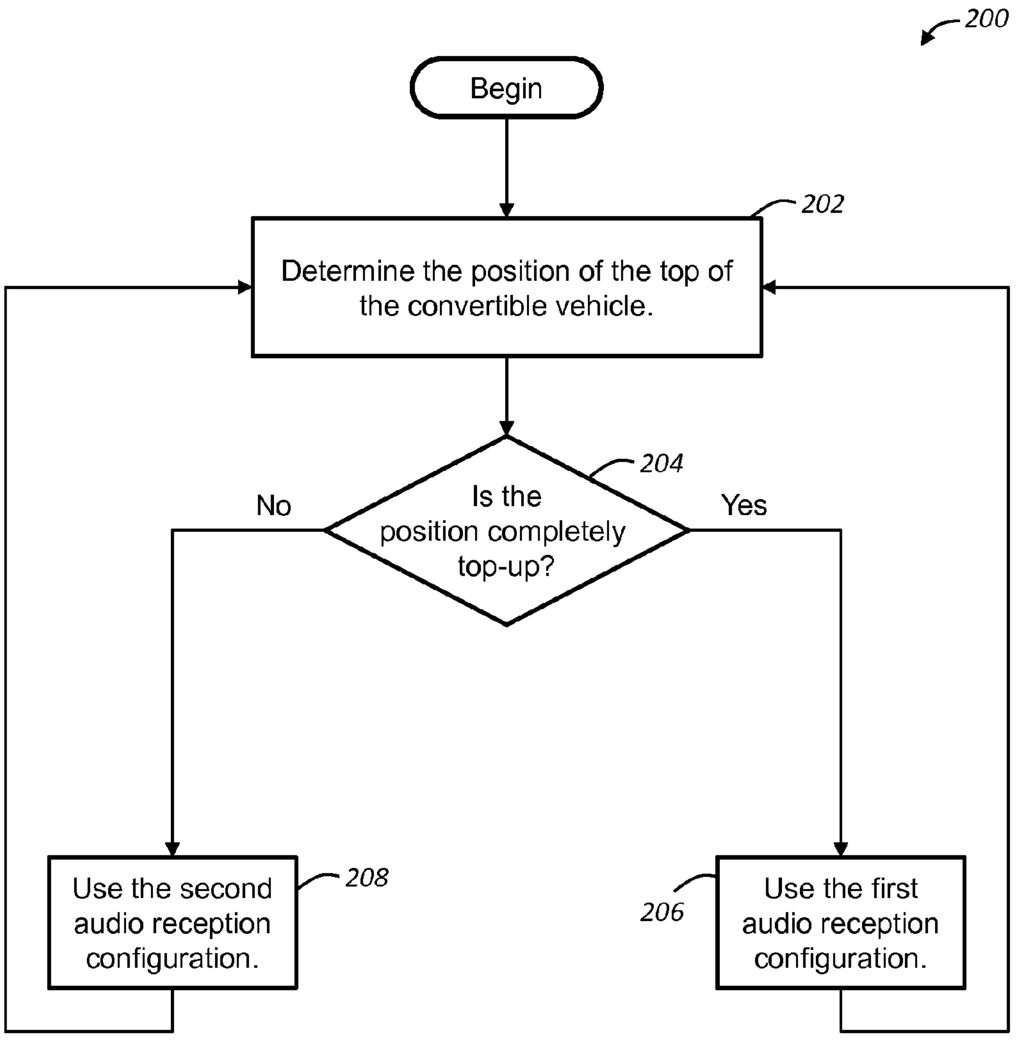
FIG. 2 is a flowchart illustrating an exemplary method of selecting one of two sets of audio reception configurations.

Now turning to FIG. 2 which illustrates one exemplary embodiment of the method described above having two audio reception configurations. First, the position of the top of the convertible vehicle is determined 202. If the top is completely up 204, then the first audio reception configuration is selected 206. But if the top is not completely up 204, then the second audio reception configuration is selected 208. The process is then repeated to continue to determine the position of the top and then select between the two configurations.

Figure 3:
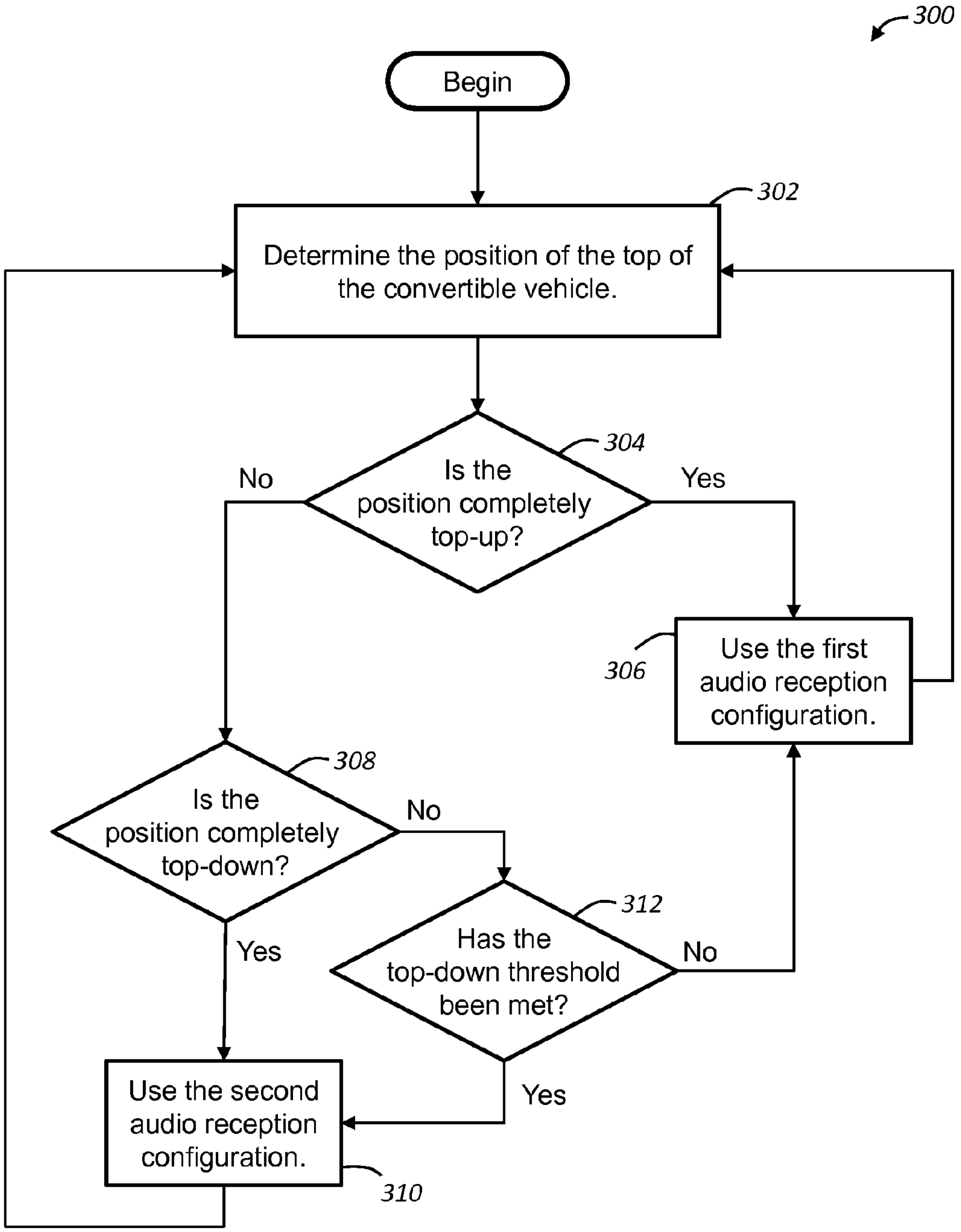
FIG. 3 is a flowchart illustrating another exemplary method of selecting one of two audio reception configurations.

Now turning to FIG. 3 which illustrates another exemplary embodiment of the method described above also having two audio reception configurations. First, the position of the top of the convertible vehicle is determined 302. If the top is completely up 304, then the first audio reception configuration is selected 306. But if the top is not completely up 304, then it is determined whether the top is completely down 308. If the top is completely down 308, then the second audio reception configuration is selected 310. If the top is not completely down 308 (and also not completely up), then it is determined whether the threshold value has been met 312 (e.g., whether the top may be 30% down or the microphone is 90% saturated). If threshold value has not been met 312, then the first audio reception configuration is selected 306. But if the threshold value has been met 312, then the second audio reception configuration is selected 310. The process is then repeated to continue to determine the position of the top and then select between the two configurations.

The threshold values illustrated above are merely exemplary. For example, other values represented the position of the top as it is lowered may be used other than 30%. In addition, 90% is exemplary; and other values up to 100% may be used without departing from the scope of this disclosure.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of configuring a hands-free acoustics system of a convertible vehicle, comprising the steps of:

a) configuring a telematics unit in the convertible vehicle to determine a position of a top of a convertible vehicle, wherein the positions include a top-up position and a top-down position, wherein the hands-free acoustics system has at least two audio reception configurations for receiving speech from an occupant of the vehicle, wherein a first audio reception configuration is associated with the top-up position and a second audio reception configuration is associated with the top-down position; and then b) configuring the acoustics system to use the first audio reception configuration when the telematics unit determines the top of the convertible vehicle is in the top-up position and to use the second audio reception configuration when the telematics unit determines the top of the convertible vehicle is in the top-down position, wherein the configuration of step (b) includes speech recognition instructions and instructions associated with the first and second audio reception configurations, both of which are stored on vehicle memory and executable by a vehicle processor.

2. The method of claim 1, wherein the acoustics system includes a microphone system having one or more vehicle microphones, wherein the at least two audio reception configurations each include a set of tuning parameters, wherein the acoustics system utilizes the microphone system to provide hands-free services according to different wind-noise environments associated with the top-up position and the top-down position.

3. The method of claim 2, wherein each of the sets of tuning parameters includes parameters associated with acoustic echo cancellation, noise reduction, automatic gain control, and send limiting.

4. The method of claim 3, wherein each of the sets of tuning parameters are based on a make and a model of the convertible vehicle.

5. The method of claim 2, wherein the microphone system includes at least one omni-directional microphone and at least one other microphone that is directable in at least one polar direction, and wherein step (b) further comprises selecting either the omni-directional or the at least one other microphone based on the determination of whether the position of the top of the convertible vehicle is top-up or top-down.

6. The method of claim 2, wherein the one or more vehicle microphones includes at least one microphone capable of operating as either an omni-directional microphone or as microphone directable in at least one polar direction and wherein step (b) further comprises selecting the microphone's directivity based on the determination of whether the position of the top of the convertible vehicle is top-up or top-down.

7. The method of claim 1, wherein step (a) further comprises configuring a vehicle system module to provide a signal from the vehicle system module to the telematics unit indicating either the top-up or the top-down position based on the determined position of the convertible top, and further comprising utilizing the first audio reception configuration or the second audio reception configuration to provide hands-free services to the occupant of the convertible vehicle based on the signal.

8. The method of claim 1, wherein the telematics unit in the convertible vehicle is a device that is capable of providing hands-free communication via a wireless cellular communication system.

9. The method of claim 2, further comprising:

configuring the telematics unit to determine whether an input at the one or more microphones exceeds a predetermined microphone saturation threshold, and when the input exceeds the predetermined microphone saturation threshold, configuring the telematics unit to switch from the first audio reception configuration to the second audio reception configuration.

10. An acoustic system for a convertible vehicle, comprising:

a) a vehicle user interface in the vehicle, wherein the vehicle user interface comprises a memory device and a processor, wherein the memory stores a first audio reception configuration and a second audio reception configuration, wherein each of the first and second audio reception configurations are predetermined and associated with a different position of a top of the convertible vehicle;

b) at least one position sensor in the vehicle having a sensor input which is coupled to the top of the convertible vehicle and a sensor output which is coupled to the vehicle user interface, wherein the sensor input detects the position of the top of the convertible vehicle, wherein a first position is a top-up position and a second position is a top-down position; and c) a microphone system in the vehicle that includes at least one microphone and is coupled to the vehicle user interface, wherein the processor is configured using instructions stored on memory of the vehicle user interface to select one of the first or second audio reception configurations based on the sensor output.

11. The system of claim 10, comprising at least two microphones, wherein a first microphone is omni-directional and a second microphone has directivity in at least one polar direction, wherein the processor is configured using instructions stored on memory of the vehicle user interface to select the first microphone or the second microphone based on the sensor output.

12. The system of claim 10, wherein the at least one microphone is capable of operating as either an omni-directional microphone or as microphone having directivity in at least one polar direction, wherein the processor is configured using instructions stored on memory of the vehicle user interface to select the directivity of the at least one microphone based on the sensor output.

13. A method of providing hands-free services using an acoustics system of a convertible vehicle, comprising the steps of:

a) configuring a telematics unit in the convertible vehicle to determine a position of a top of the convertible vehicle, wherein the positions include a top-up position and a top-down position, wherein the acoustics system comprises at least two audio reception configurations that include a first audio reception configuration associated with the top-up position and a second audio reception configuration associated with the top-down position, wherein the first audio reception configuration includes a first set of tuning parameters for use with a uni-directional microphone in the convertible vehicle, wherein the second audio reception configuration includes a second set of tuning parameters for use with an omni-directional microphone in the convertible vehicle; and then b) providing hands-free services:

using the uni-directional microphone, the first audio reception configuration, and the first set of tuning parameters when it is determined that the top of the vehicle is in the top-up position, or using the omni-directional microphone, the second audio reception configuration, and the second set of tuning parameters when it is determined that the top of the vehicle is in the top-down position.

14. The method of claim 13, wherein step (b) further comprises providing hands-free services using the omni-directional microphone and the uni-directional microphone, the second audio reception configuration, and the second set of tuning parameters when it is determined that the top of the vehicle is in the top-down position.

15. The method of claim 13, wherein step (b) further comprises providing hands-free services using the omni-directional microphone and the uni-directional microphone, the second audio reception configuration, and a third set of tuning parameters when it is determined that the top of the vehicle is in the top-down position, wherein the third set of tuning parameters differs from the second set of tuning parameters.

16. The method of claim 1, wherein steps (a) and (b) are carried out by a vehicle manufacturer or vehicle service center.

* * * * *